United States Patent
Bosler

(10) Patent No.: US 8,019,989 B2
(45) Date of Patent: Sep. 13, 2011

(54) PUBLIC-KEY INFRASTRUCTURE IN NETWORK MANAGEMENT

(75) Inventor: Martin Bosler, Wannweil (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1296 days.

(21) Appl. No.: 10/455,691

(22) Filed: Jun. 6, 2003

(65) Prior Publication Data

US 2005/0010757 A1    Jan. 13, 2005

(51) Int. Cl.
    *H04L 29/06* (2006.01)
(52) U.S. Cl. ........................................ 713/156
(58) Field of Classification Search ............. 713/156, 713/175, 178; 717/11, 174
    See application file for complete search history.

(56) References Cited

U.S. PATENT DOCUMENTS

| | | | | |
|---|---|---|---|---|
| 5,715,403 A | * | 2/1998 | Stefik | 705/44 |
| 5,970,475 A | * | 10/1999 | Barnes et al. | 705/27 |
| 6,065,117 A | * | 5/2000 | White | 713/159 |
| 6,134,658 A | * | 10/2000 | Multerer et al. | 713/175 |
| 6,220,768 B1 | * | 4/2001 | Barroux | 709/224 |
| 6,292,941 B1 | * | 9/2001 | Jollands | 717/176 |
| 6,336,186 B1 | * | 1/2002 | Dyksterhouse et al. | 713/156 |
| 6,668,375 B1 | * | 12/2003 | Leovac | 717/174 |
| 6,678,731 B1 | * | 1/2004 | Howard et al. | 709/225 |
| 6,862,582 B2 | * | 3/2005 | Harada et al. | 705/51 |
| 6,931,546 B1 | * | 8/2005 | Kouznetsov et al. | 726/23 |
| 6,948,070 B1 | * | 9/2005 | Ginter et al. | 713/193 |
| 6,981,041 B2 | * | 12/2005 | Araujo et al. | 709/224 |
| 6,986,047 B2 | * | 1/2006 | Giles et al. | 713/175 |
| 6,996,720 B1 | * | 2/2006 | DeMello et al. | 713/189 |
| 7,016,878 B2 | * | 3/2006 | Yoshioka et al. | 705/51 |
| 7,043,441 B1 | * | 5/2006 | Maher | 705/1 |
| 7,099,947 B1 | * | 8/2006 | Nadeau et al. | 709/229 |
| 7,107,445 B2 | * | 9/2006 | Trapp et al. | 713/150 |
| 7,114,070 B1 | * | 9/2006 | Willming et al. | 713/156 |
| 2002/0032856 A1 | * | 3/2002 | Noguchi et al. | 713/156 |
| 2002/0073311 A1 | * | 6/2002 | Futamura et al. | 713/157 |
| 2002/0099668 A1 | * | 7/2002 | Perlman | 705/76 |
| 2002/0112232 A1 | * | 8/2002 | Ream et al. | 717/176 |
| 2002/0143964 A1 | * | 10/2002 | Guo et al. | 709/229 |
| 2002/0154782 A1 | * | 10/2002 | Chow et al. | 380/278 |
| 2002/0157091 A1 | * | 10/2002 | DeMello et al. | 717/178 |
| 2002/0162028 A1 | * | 10/2002 | Kennedy | 713/202 |
| 2003/0033521 A1 | | 2/2003 | Sahlbach | |

(Continued)

FOREIGN PATENT DOCUMENTS

EP    1 244 251 A1    5/2002

(Continued)

OTHER PUBLICATIONS hpOpenView Quick Reference Guide, Feb. 2003.

(Continued)

*Primary Examiner* — Nasser Moazzami
*Assistant Examiner* — Daniel Hoang

(57) ABSTRACT

A method of granting a public-key certificate to a managed node in an IT network is provided. A request from the managed node to grant the certificate is received at a certification server. It is ascertained whether an initialization-to-request time interval between an initialization time of the managed node and a request time assigned to the request is within a maximum time interval for automatic certificate grant. The requested certificate is automatically granted if the initialization-to-request time interval is within the maximum time interval.

34 Claims, 8 Drawing Sheets

U.S. PATENT DOCUMENTS

| | | | |
|---|---|---|---|
| 2004/0030901 A1* | 2/2004 | Wheeler et al. | 713/176 |
| 2004/0093493 A1* | 5/2004 | Bisbee et al. | 713/156 |
| 2004/0103175 A1* | 5/2004 | Rothman et al. | 709/222 |
| 2004/0128503 A1* | 7/2004 | Watanabe et al. | 713/157 |
| 2004/0158709 A1* | 8/2004 | Narin et al. | 713/156 |
| 2004/0177335 A1* | 9/2004 | Beisiegel et al. | 717/102 |
| 2005/0097056 A1* | 5/2005 | DeMello et al. | 705/57 |
| 2005/0114647 A1* | 5/2005 | Epstein | 713/153 |

FOREIGN PATENT DOCUMENTS

| | | |
|---|---|---|
| EP | 1 257 087 A1 | 11/2002 |
| WO | WO 01/24444 A2 | 4/2001 |

OTHER PUBLICATIONS

W. Richard Stevens: TCP/IP Illustrated, vol. 1, The Protocols, 1994, pp. 359-388.

U. Blumenthal et al: User-based Security Model (USM) for version 3 of the Simple Network Management Protocol (SNMPv3) Network Working Group, RFC 2574, Apr. 1999, http://www.ietf.org/rfc/rfc2574.txt.

Microsoft Windows 2000 Security Technical Reference, Redmond 2000, pp. 163 and 175 to 208.

Andrew S. Tannenbaum: Computer Networks, $4^{th}$ edition 2003, Pearson Education International, pp. 752-755, 760-762, 765-770, 798-799, 813-816.

Bruce Schneier, Applied Cryptography, John Wiley & Sons, second edition, 1996, pp. 309-332, 37-39, 41-44.

D. Mills: Simple Network Time Protocol (SNTP) Version 4 for Ipv4, Ipv6 and OSI Oct. 1996, http://www.ee.cis.udel.edu/~mills/database/rfc/rfc2030.txt.

RFC2246 T. Dierks et al., The TLS Protocol Version 1.0, Jan. 1999, http://www.ietf.org/rfc/rfc2246.txt).

* cited by examiner

PUBLIC-KEY INFRASTRUCTURE IN NETWORK MANAGEMENT

FIELD OF THE INVENTION

The present invention relates generally to a public-key infrastructure in network management, and for example, to a method for deciding whether to grant a public-key certificate, a method of setting up a management agent, a method of carrying out management communication, computer program products for carrying out these methods, a certification server, and a managed IT network.

BACKGROUND OF THE INVENTION

Due to the increasing complexity of modern information technological (IT) networks, integrated network management systems have become an important tool for the set-up and operation of IT networks. For example, Hewlett-Packard offers such a network management system under the name "hp OpenView" (see, for example, hp OpenView Quick Reference Guide, February 2003). One task of "network management" is monitoring the status, performance or availability of network elements and providing monitoring results, for example, to a network operator or a service responsible. Typically, network monitoring includes an alarm functionality which alerts the operator or the service responsible in the case of an incident which requires attention, for example, a fault, an impending fault, or a decline of performance or availability of a network element. Typically (but not necessarily) a network management system not only provides a flow of information from managed network elements to a management server and, e.g. to the network operator, but also enables managed network elements to be manipulated, e.g. by the network operator or, automatically, by a network management process. "Manipulating" may, for example, comprise configuring network elements or changing their existing configuration, starting and stopping processes in network elements, allocating memory to network elements, etc.

Typically, network management systems are distributed systems which include, on the one hand, distributed management software that runs on the managed network elements (also called "managed nodes"). The management software running in the managed node is called "agent". On the other hand, a typical network management system includes a management server which communicates with the agents and is superordinate to them. The communication is typically two way: the management server receives information from the agents about the function of the managed node with which the respective agent is associated, or it sends a request or an instruction to an agent. In the OpenView management system, which is such a distributed management system, the agents do not simply forward information obtained from their node to the management server, but rather have some "intelligence". For example, an agent is arranged to filter information it receives from its managed node via SNMP requests, or which it finds in a log file of the managed node, according to user-defined rules, and forwards only the information which passes this filter to the management server (a description of SNMP (Simple Network Management Protocol) can, for example, be found in W. Richard Stevens: TCP/IP Illustrated, Vol. 1, The Protocols, 1994, pp 359-388). Management systems of this kind are, for example, described in EP 1 244 251 A1 and EP 1 257 087 A1. The communication between the agents and the management server is not based on SNMP, but uses a more powerful network management protocol which is proprietary to the network management system.

Although network management is often located within a non-public domain of networks, network security may also be an issue in network management systems. For example, the use of symmetric secret key encryption has been proposed in the framework of SNMP in order to provide for user authentication and message integrity control (see U. Blumenthal et al.: User-based Security Model (USM) for version 3 of the Simple Network Management Protocol (SNMPv3), Network Working Group, RFC 2574, April 1999, http://www.ietf.org/rfc/rfc2574.txt). WO 01/24444 A2 describes the application of this proposal to a broadband access network. US 2003/0033521 describes the use of public-key encryption to verify an authorization to request a switch user operation in the framework of a network management system.

Generally, at least some of the operating systems currently on the market provide a user authentication functionality and a public-key infrastructure (see, for example, Microsoft Windows 2000 Security Technical Reference, Redmond 2000, pp 163 and 175 to 208). In order to secure communication via the Internet, a security protocol called SSL (Secure Sockets Layer) has been developed, which is now widely used. SSL builds a secure connection between two sockets (sockets are transport service primitives), including mutual authentication of client and server (see, for example, Andrew S. Tanenbaum: Computer Networks, $4^{th}$ edition, 2003, Pearson Education International, pp 813-816).

SUMMARY OF THE INVENTION

A first aspect of the invention is directed to a method of granting a public-key certificate to a managed node, with which an initialization time is associated, in an IT network. The method according to the first aspect comprises: receiving a request to grant the certificate from the managed node; assigning to the request, a request time, indicating the time of the request; ascertaining whether an initialization-to-request time interval between the initialization time and the assigned request time is within a maximum time interval for automatic certificate grant; automatically granting the requested certificate if the initialization-to-request time interval is within the maximum time interval.

According to another aspect, a method is provided of setting-up a management agent in a node of an IT network in which managed nodes are authenticated in management communications, the authentication being based on public-key cryptography. It comprises: installing the agent at the node at an initialization time; requesting, by the agent, a certification server to grant a public-key certificate, at a request time; automatically granting, by the certification server, the requested certificate if the time interval between the initialization time and the request time is within a maximum time interval for automatic certificate grant.

According to another aspect, a method is provided for carrying out management communication between a first and a second management element of an IT network, wherein a private-public key pair is assigned to at least the first management element. It comprises authenticating at least the first management element by using the first management element's private-public key pair. The step of authenticating includes verifying the authenticity of the first management element's public key by a public-key certificate which was automatically granted in a procedure requiring that a time interval between an initialization time of the first management element and a certificate request time is within a maximum time interval for automatic certificate grant.

According to another aspect, a certification server is provided. It is arranged to ascertain, upon a request to grant a public-key certificate to a managed node in an IT network, whether an initialization-to-request time interval between an initialization time of the managed node and a request time assigned to the request is within a maximum time interval for automatic certificate grant; and to automatically grant the requested certificate if the initialization-to-request time interval is within the maximum time interval.

According to another aspect, a managed IT network is provided. It comprises: a management server, a certification server and a node; or a combined management/certification server and a node. The management server or the management/certification server is arranged to initiate installation of a management agent at the node at an initialization time. The agent is arranged to request the certification server or the management/certification server to grant a public-key certificate, at a request time. The certification server or the combined management/certification server is arranged to automatically grant the requested certificate if the time interval between the initialization time and the request time is within a maximum time interval for automatic certificate grant.

According to another aspect, a managed IT network comprising at least first and a second management elements is provided. A private-public key pair is assigned to at least the first management element. The IT network is arranged to authenticate, in management communications between the first and second management elements, at least the first management element by using the first management element's private-public key pair. The IT network is arranged also to verify the authenticity of the first management element's public key by a public-key certificate which was automatically granted in a procedure requiring that a time interval between an initialization time of the first management element and a certificate request time is within a maximum time interval for automatic certificate grant.

According to another aspect, a computer program product including program code for carrying out a method, when executed on a computer system, of granting a public-key certificate to a managed node in an IT network, is provided. The program code is arranged to: receive a request to grant a certificate from the managed node; ascertain whether an initialization-to-request time interval between an initialization time of the managed node and a request time assigned to the request is within a maximum time interval for automatic certificate grant; automatically grant the requested certificate if the initialization-to-request time interval is within the maximum time interval.

According to another aspect, a computer program product including program code for carrying out a method, when executed in a managed IT network in which managed nodes are authenticated in management communications, the authentication being based on public-key cryptography, of setting-up a management agent in a node, is provided. The program code is arranged to: install the agent at the node at an initialization time; request, by the agent, the certification server to grant a public-key certificate, at a request time; automatically grant, by the certification server, the requested certificate if the time interval between the initialization time and the request time is within a maximum time interval for automatic certificate grant.

According to another aspect, a computer program product including program code for carrying out management communication, when executed in a managed IT network, between at least a first and a second management element is provided. A private-public key pair is assigned to at least the first management element. The program code is arranged to authenticate at least the first management element using the first management element's private-public key pair. The step of authenticating includes verifying the authenticity of the first management element's public key by a public-key certificate which was automatically granted in a procedure requiring that a time interval between an initialization time of the first management element and a certificate request time is within a maximum time interval for automatic certificate grant.

Other features are inherent in the methods and products disclosed or will become apparent to those skilled in the art from the following detailed description of embodiments and its accompanying drawings.

DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
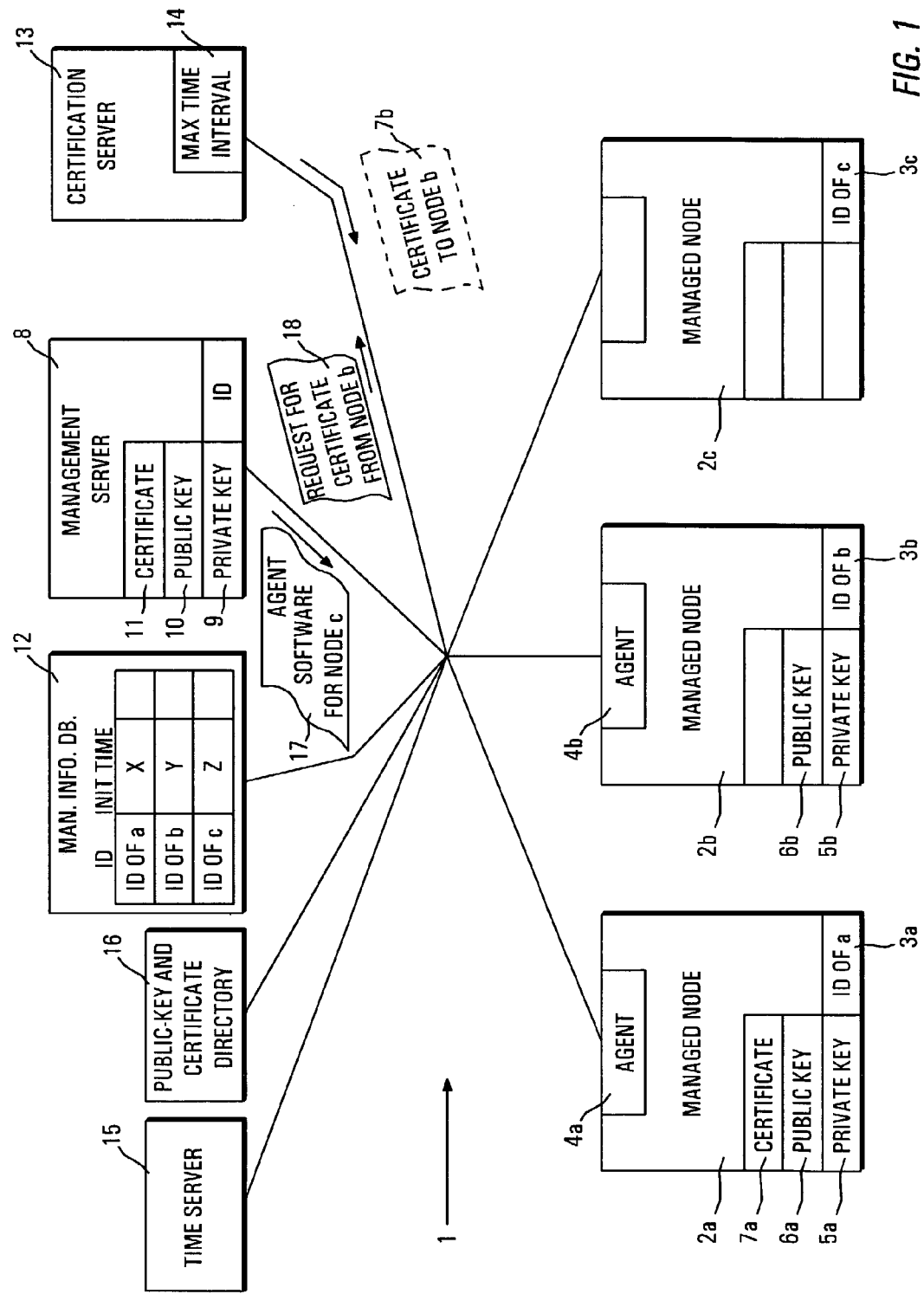
FIG. 1 is a block diagram of an exemplary managed IT network.

FIG. 1 illustrates an exemplary managed IT network. Before proceeding further with the detailed description of FIG. 1, however, a few items of the embodiments will be discussed.

Historically, in conventional symmetric-key cryptography, distributing the keys (which will be consistently referred to as secret keys hereinafter) has always been the weakest link in most cryptosystems. No matter how strong a cryptosystem was, if an intruder was able to steal the key, the system was worthless. Keys had to be protected from theft, but they also had to be distributed to all users of the system. This was an inherent build-in problem (see, for example, Tanenbaum, page 752).

The need to distribute secret keys has been overcome by public-key cryptography in which two different keys are used—one public and the other private (this terminology will be used consistently hereinafter in contrast to the secret keys used for conventional symmetric-key cryptography). It is computationally hard to deduce the private key from the public key. Anyone with the public key can encrypt a message but not decrypt it. Only the person (or computer) with the private key can decrypt the message. In contrast to symmetric-key cryptography, the private key need not be distributed, but can be kept secret in a protected domain of the decryptor's computer. Mathematically, this process is based on what is called "trap-door one-way functions". These are functions which are easy to compute in one direction and hard to compute in the other direction. But, if the "trap-door" is known, one can easily compute the function in the other direction. If secrecy is to be achieved, encryption is the easy direction. Instructions for encryption are the public key; anyone can encrypt a message. Decryption is the hard direction, typically made hard enough that even with fast computers many years (typically thousands of years) are needed to decrypt the message without the "trap-door". The trap-door is the private key (see: Bruce Schneier, Applied Cryptography, John Wiley & Sons, second edition, 1996, pp 31-32; and Tanenbaum, pp 752-753). If authentication is to be achieved, the roles of the private and public keys may be interchanged: a message may then be encrypted with the sender's private key and decrypted by the recipient with the sender's public key.

A widely used public-key algorithm is RSA which is based on the difficulty of factoring large numbers. Other public-key algorithms are based on the difficulty of computing discrete logarithms modulo a large prime. Further algorithms are based on elliptic curves (see Tanenbaum, pp 753-755).

Assuming that the purpose of using public-key cryptography is secrecy, i.e. for example, Alice wants to send a secret message to Bob. This is a cryptographic protocol by which secret transmission can be achieved (for the purpose of illustration, the widely used "Alice-Bob" language is also used herein, although in the embodiments messages are mainly interchanged between machines (e.g. computers) rather than persons; therefore, Alice and Bob can be thought of as names of machines):

(1) Bob sends Alice his public key, or Alice gets Bob's public key from a (publicly accessible) database.
(2) Alice encrypts her message using Bob's public key and sends it to Bob.
(3) Bob decrypts Alice's message using his private key.

No secret key has to be distributed. No-one else can read the encrypted message because it is too difficult to derive Bob's private key from his publicly known public key. Thus, a secure channel between Alice and Bob is established (cf Schneier, pp 31-32).

Besides secrecy, public-key cryptography can be used to establish authenticity and integrity of a document by using what is called a "digital signature". The basic authentication protocol is simple:

(1) Alice encrypts the document with her private key, thereby signing the document.
(2) Alice sends the signed document (i.e. the digital signature) to Bob.
(3) Bob decrypts the document with Alice's public key, thereby verifying the signature.

Only Alice knows her private key; when Bob verifies the document with Alice's public key, he knows that she signed it ("authenticity"). The signed document is unalterable; if there is any alteration to the document, the signature can no longer be verified with Alice's public key ("integrity") (see Schneier, pp 37-38).

Public-key algorithms are often, relatively inefficient, in particular if long documents have to be signed. To save time, in some embodiments of the public-key infrastructure described above, digital signature protocols are implemented with one-way hash functions. A one-way hash function is a compression function (often called a "message digest"). A hash function takes a variable-length input string (called a "pre-image") and converts it to a (generally smaller) output string which has typically a fixed length (called a "hash value"). A one-way hash function is a hash function that works in one direction; it is easy to compute a hash value from a pre-image, but it is hard to generate a pre-image that hashes to a particular value. A good one-way hash function is also collision-free, which means that it is hard to generate two pre-images with the same hash-value (see Schneier, pp 30-31). The most widely used one-way hash functions are MD5 and SHA-1 (see Tanenbaum, pp 760-762).

In some of the embodiments, authentication is based on hashes of documents, not the documents themselves. The basic authentication protocol described above is then modified; instead of signing a document, a hash of the document is signed (see Schneier, pp 38-39 and 41-44):

(1) Alice produces a one-way hash of a document.
(2) Alice encrypts the hash with her private key, thereby signing the document.
(3) Alice sends the document and the signed hash (i.e. the encrypted hash) to Bob.
(4) Bob produces a one-way hash of the document that Alice sent. Then, using the digital signature algorithm, he decrypts the signed hash with Alice's public key. If the signed hash matches the hash he generated, the signature is valid.

However, there is one problem in public-key cryptography: How do Alice and Bob get each other's public keys to start the communication process? One solution would be publishing the key somewhere in a network so that it can be obtained by all interested participants by a sort of GET request. However, an intruder (called "Trudy") could intercept the request and reply with a false public key (e.g. Trudy's public key). Trudy could then produce a one-way hash of a document, encrypt it with her private key and send the document and the signed hash to Bob. Bob would decrypt the signed hash with Alice's supposed public key (which is actually Trudy's public key) and would believe that Alice signed the document. Trudy could also intercept a document with a signature sent from Alice to Bob, modify the document, produce a one-way hash of the modified document, encrypt the hash with Trudy's private key and send the document and the signed hash to Bob. Bob would decrypt the signed hash with Alice's supposed public key and would believe that the document is unaltered (see Tanenbaum, p. 765).

A way of distributing public keys securely is based on public-key certificates. An organization or computer that certifies public keys is called a CA (Certification Authority). Generally, a certificate certifies that a certain public key belongs to a certain person or network node. The CA itself has a private and public key pair, and the certificate contains a hash of the certificate signed with the CA's private key. It is assumed that the CA's public key is known to all persons or nodes participating in the communication, and can therefore not be replaced by an intruder by a false key. A participant who receives such a public-key certificate verifies the authenticity and integrity of the public-key certificate, and, thereby the public key by the verification protocol described above, i.e. by producing a one-way hash of the certificate and decrypting the signed hash with the CA's public key. If the signed hash matches the hash generated, the signature is valid, i.e. the certified public key is authentic and unaltered (see Tanenbaum, pp 765-767). Instead of only one CA, in larger networks there may be a hierarchy of CAs, in which a top-level CA certifies second-level CAs, which, in turn, certify further CA levels, whereby the last level may be real CAs which issue certificates (see Tanenbaum, pp 768-770). In order to enable public-key certificates to be freely interchanged and used among participants, the certificate format has been standardized. The standard is called X.509 and is in widespread use on the Internet (see Tanenbaum, pp 767-768).

Instead of exchanging a digital signature (i.e. a signed document or signed hash), in some of the embodiments the communication between two communicating participants takes place within a secure session established by authentication of at least one of the participants, or mutual authentication of both participants, based on public-key cryptography. An example of a secure-session establishment with mutual authentication is (see Tanenbaum, pp 798-799):

(1) Alice receives Bob's public key, e.g. from Bob or a public-key directory;
(2) Alice sends Bob a message containing a random number (called "nonce"); Alice encrypts the message with Bob's public key (but not with Alice's private key, as in the digital-signature protocols above).
(3) Bob obtains Alice's public key, e.g. from Alice or a public-key directory.
(4) Bob decrypts the message containing Alice's nonce and sends a message to Alice, containing Alice's nonce as well as a nonce and a proposed session key chosen by him; Bob encrypts this message with Alice's public key.
(5) Alice decrypts Bob's message using her private key; when she sees her nonce in it, she knows that Bob got her message since no-one else has a way of determining her nonce.
(6) Alice encrypts Bob's nonce with the session key (now using symmetric encryption techniques) and sends this to Bob.
(7) Bob decrypts this message with the session key; when he sees his nonce he knows Alice got his message.

A secret (symmetric) key has now been defined which is only known to Alice and Bob. A secure session can now be performed by encrypting the messages exchanged during the session with the secret session key (using symmetric encryption and decryption). Since only Alice and Bob know the session key, the fact that a message has been encrypted with the session key verifies the authenticity of the sender, who is either Alice or Bob. However, an intruder (Trudy) could again intercept the communication between Alice and Bob and make Alice believe that she communicates with Bob rather than with Trudy. Again, this is excluded by requiring that Bob's public key and also Alice's public key are verified by public-key certificates.

In order to enable such secure connections between participants in the Internet, a security protocol called SSL (Secure Sockets Layer) has been introduced. The SSL protocol is now widely used, and SSL software is available as open-source software (e.g. Open SSL). When HTTP is used over SSL, it is called HTTPS (Secure HTTP). A recent version of SSL (Version 3.1) is also called TLS (Transport Layer Security); it is described in RFC2246 (T. Dierks et al., The TLS Protocol Version 1.0, January 1999, http://www.ietf.org/rfc/rfc2246.txt). In some of the embodiments, the SSL protocol is used to establish a secure connection ("session") between a first management element (a managed node) and a second management element (e.g. a management server or another managed node). In such a secure connection, first a parameter negotiation between the first management element and the second management element is carried out. Then, an authentication of the first management element, and preferably, the second management element, i.e. a mutual authentication takes place. The authentication is valid for the whole session. This is achieved by encrypting all messages exchanged during the session based on symmetric cryptography. The secret key used is exchanged between the first and second management element encrypted with the first and/or second management element's public key during the authentication phase. The authenticity of the public keys is verified by public-key certificates, as explained above. Data integrity is also protected during the whole session. For details about SSL, see, for example, Tanenbaum, pp 813-816. Of course, any other (proprietary or standardised) protocol providing secured connections can be used instead of SSL.

In the embodiments, the messages to be exchanged during such a session include management messages which form a management communication between management elements of an IT network. The management elements include a management server and managed nodes. In some of the embodiments, management of the network includes monitoring the status, performance or availability of the managed nodes and providing monitoring results, for example, to a network operator of a service responsible. In some of the embodiments, network monitoring includes an alarm functionality which alerts the operator or the service responsible in the case of an incident which requires attention, for example, to a fault, an impending fault, or a decline of performance or availability of a managed node. The network management system not only provides a flow of information from the managed nodes to the management server and, e.g., to the network operator, but also enables the managed nodes to be manipulated, e.g., by the network operator or, automatically, by network management process. In some of the embodiments, "manipulating" includes configuring a managed node or changing its existing configuration, starting and stopping processes in a managed node, allocating memory to a managed node, etc. The network management system is a distributed system which includes, on the one hand, distributed management software that runs on the managed node; this software is called "agent". On the other hand, the management server communicates with the agents and is superordinate to them. In some of the embodiments, the communication is two way: the management server receives messages from the agents containing information about the function of the managed node with which the respective agent is associated, or it sends messages containing a request or an instruction to an agent. In some of the embodiments, management messages may also be directly sent from first managed node to a second managed node; for example, if a process on the second managed node depends on the status of the first managed node, the first managed node may directly send management messages including status information about the first managed node to the second managed node. In some of the embodiments, the agents do not simply forward information from their managed node to the management server or another managed node, but they are rather arranged to filter information they receive from their managed nodes, e.g. via SNMP requests, or find in a log file of the corresponding managed node. The filtering is preferably carried out according to user-configurable rules. The agents forward only the information which passes this filter to the management server or other managed nodes. In the embodiments, the management communication between the agents and the management server is not based on SNMP, but preferably uses a more powerful network management protocol which may, for example, be proprietary to the network management system.

In some of the embodiments the network management is located within a non-public domain of networks. Even in these embodiments, management-element authentication is carried out in the management communication, based on public-key cryptography. For this purpose, a private and public key pair is assigned to each of the management elements. Assume that a management message is to be sent from a first management element to a second management element. Then, in some of the embodiments a secure session is established, which includes mutual authentication of both management elements using their public keys. The management message is then sent during the secure session. In other embodiments, the message itself is authenticated by a digital signature. The digital signature is generated by the first management element by using the private key of the first management element (i.e. its own private key). The first management element then sends the management message to the second management element. The second management element, in turn, verifies the authenticity of the sender by using the sender's public key (here: the first management element's public key). In both types of embodiments, verifying the authenticity of a management element includes verifying the authenticity of its public key by a certificate of this public key. The public key and/or the public-key certificate may, for example, be sent to the other managed element, either together with a nonce, i.e., a parameter that varies with time, such as a time stamp, a session key or the management message to be authenticated, or separately. Alternatively, the public key and/or the public-key certificate may be stored somewhere in the network (e.g. in a public-key and certificate directory) and fetched by the respective management element for encryption/decryption of messages and verification of public keys.

Before a certificate is granted to a first management element, authentication based on public-key cryptography is not yet available for it. However, in this preliminary phase, communication with the management and/or certification server has already taken place; for example, communication which causes the management element's agent to be installed. In order to also provide this preliminary communication with some (reduced) security, in some embodiments, data exchanged in the preliminary-communication phase is encrypted with a symmetric key sent to the management element. The key is, for example, sent in "hard-coded" form in binaries of compressed software packages exchanged at the begin of the preliminary-communication phase, so that they are available on both sides after the compressed software packages were deployed and installed.

In the embodiments, the task of the CA is taken by a certification server. "Certification server" is meant to be a functional term: it may either be a separate machine dedicated to the task of granting public-key certificates, or a process with this functionality in a machine which also serves other purposes, for example the management server. The certification server itself has a private-public key pair. The public-key certificates granted by the certification server contain a digital signature of the certification server generated with the certification server's private key. Verification of the authenticity of a network element's public key includes verifying the certification server's digital signature of the certificate, by using the certification server's public key.

The task of a public-key certificate is to bind a public key to a certain principal (e.g. an individual, a company, here: a management element). Normally, granting a certificate upon a request received from a managed node would require human interaction; for example, an administrator would grant the certificate request. This is because issuing a public-key certificate is a security-sensitive task. Automatically granting certificates on request might therefore create an unacceptable "security gap".

In the embodiments, another approach is realized: Public-key certificates are automatically issued upon request from a managed node, provided that the time interval between an initialization time of the managed node and a request time assigned to the request (called "initialization-to-request time interval") is within a predefined maximum time interval. For example, the "initialization time" is the point of time at which the agent was installed on the managed node. This enables the amount of necessary human interaction to be reduced to those cases in which the initialization-to-request time interval is longer than the maximum time interval. On the other hand, a "security gap" exists only during the (relatively short) initialization phase, which is acceptable for typical network-management applications.

In the embodiments, management agents are automatically set-up by the management server, the management server deploys a management-agent software package to the respective node. Upon receipt of the package, the agent is installed in an auto-installation procedure at the node. In some of the embodiments the "initialization time" is the point of time at which the management server deploys the agent-software package to the agent or sends a request to the agent to actually start the auto-installation procedure. In other embodiments, the agent sends a confirmation to the management server indicating that it has started or completed the auto-installation procedure; in some of the embodiments, the "initialization time" is the point of time at which the management server receives such a confirmation. During the installation procedure, a private-public key pair is also generated at the node. The private key is securely stored in the node. At the end of the installation procedure, the agent notes that its public key is not yet certified. Accordingly, it sends a certificate-grant request to the certification server (which may be a combined management/certification server, as mentioned above). In the embodiments, the time of receipt of this request is considered as the "request time". If the initialization-to-request time interval determined in this way is within the maximum time interval, the request is granted and the requested public-key certificate is issued. It is sent to the node from which the request came, and may, in addition, be stored in a directory (in which the public key associated with the request may also be stored).

In the embodiments, the initialization time is stored, e.g. in a management information database, as a property of the managed node. When the certification server receives later a certificate-grant request from this node, it recalls the stored initialization time and calculates the initialization-to-request time interval from it. If machines with different clocks are used to determine the initialization time and the request time, a bias might be introduced if the two clocks do not run synchronously. Therefore, in those embodiments, the different clocks are synchronized, for example by using a clock synchronization procedure based on the Simple Network Time Protocol (see, for example, D. Mills: Simple Network Time Protocol (SNTP) Version 4 for IPv4, IPv6 and OSI, October 1996, http://www.ee.cis.udel.edu/~mills/database/rfc/rfc2030.txt). In other embodiments, one and the same computer clock is used to determine the initialization time and the request time, e.g. in embodiments in which the certification server and the management server are processes running on the same machine. In such embodiments, the initialization-to-request time interval is correctly determined even if the clock is wrong, since the time interval is a difference between two absolute time measurements.

The maximum time interval for automatic certificate grant is configurable, for example by an administrator or operator of the IT network. The maximum time interval chosen will be somewhat longer than the typical time needed for the agent-software package to be transferred to the node and the agent to install itself at the node; a typical maximum time interval may be in the order of 5 minutes.

The embodiments of the computer program products with program code for performing the described methods include any machine-readable medium that is capable of storing or encoding the program code. The term "machine-readable medium" shall accordingly be taken to include, but not to be limited to, solid state memories, optical and magnetic storage media, and carrier wave signals. The program code may be machine code or another code which can be converted into machine code by compilation and/or interpretation, such as source code in a high-level programming language, such as C++, or in any other suitable imperative or functional programming language, or virtual-machine code.

The hardware on which the program code is executed, is in the form of computer systems representing the certification server, the management server (which may be combined), and the managed nodes. For example, the computer systems include a processor and a main memory which communicate with each other via a bus, as well as network interface devices and, optionally, further storage and input/output devices. The program code may be stored within the processor, the main memory and/or the further storage devices and may be transmitted or received via the network interface device.

Returning now to FIG. 1, it illustrates an exemplary managed IT network 1. The network 1 includes three managed nodes 2a, 2b, 2c. The managed nodes may, for example, be network interconnecting devices, such as bridges, switches, routers, and/or end devices, such as desktop computers, workstations, servers, etc. In a more generalized sense, a "managed node" may also be a managed application, wherein more than one such managed application may run on one machine. Each managed node 2 is identified by an identifier ID stored in an identifier field 3 in the managed node 2. Each managed node 2 has an agent 4 which is responsible for local management-related processing and communication with other management elements of the IT network 1. In the example of FIG. 1, the third managed node 2c is shown in an initialization phase in which its agent has not yet been installed. A private key 5, a public key 6 and a public-key certificate 7 are stored in the managed nodes 2, wherein the private key 5 is stored in a secured manner in which it is only visible to a user, for which the agent 4 runs, for example, a network administrator. The third managed node 2c has no keys yet, and the second node 2b is shown in an intermediate state in which it already has private and public keys 5, 6, but no public-key certificate yet.

A management server 8 is the central counterpart to the distributed agents 4. It receives information from the agents 4 about the function of the respective managed nodes 2, and sends management requests or instructions to the agents 4. The management server 8 also has a private key 9, a public key 10 and a public-key certificate 1.

A management information database 12 stores management-related data. As illustrated in FIG. 1, among this data is stored a table with one data set for each managed node 2, identified by the managed node's ID. One of the dataset attributes of this table is the initialization time of the respective agent 4. The management information database 12 can be accessed by the management server 8 as well as by the agents 4 and other management elements, such as a certification server 13. However, only the management server 8 has write access to the table including the initialization time, mentioned above.

The certification server 13 is arranged to receive a certificate-grant request and to issue the requested public-key certificate, provided that the time interval between the initialization time and the request time (i.e. the time when the certificate-grant request was received at the certification server 13) is within a maximum time interval 14 stored, for example, in the certification server 13. The time interval 14 is, configurable by an authorized user, e.g. a network operator. In order to decide whether the certificate is granted, the certification server accesses the management information database 12 and recalls the stored initialization time for the managed node 42 from which the certificate-grant request was received.

In order to ensure that the management server's clock (which defined the initialization time stored in the management information database 12) and the certification server's clock (which defines the request time) are synchronized, a time server 15 is provided which provides both servers 8, 13 with time information, for example based on the Simple Network Time Protocol. In other embodiments, the management server 8 and the certification server 13 reside on one machine and access the same computer clock; the relative timing of the initialization time and the request time is correct in these embodiments, without synchronization or the like.

A public-key and certificate directory 16 stores the public key and the associated public-key certificate of all network elements, and provides the public-key and the certificate of a particular network element upon request. The public-key and certificate directory 16 can be used in addition to or instead of the public key and certificate storages 6, 7, 10, 11 in the individual management elements 2, 8. As already mentioned above, FIG. 1 illustrates the IT network 1 in a state in which the agent of the third managed node 2c has not yet been installed. The management server 8 is sending an agent-software package, denoted by "17", to the third managed node 2c via the network 1. The second node 2b is in a state in which the agent 4b has already been installed. The agent 4b has already generated a private key 5 and a public key 6, and has automatically sent a certificate-grant request, denoted by "18" in FIG. 1, to the certification server 13. Upon receipt of the request 18, the certification server 13 verifies that the initialization-to-request time interval is within the maximum time interval 14, as described above. If the result of the verification is positive, it issues a public-key certificate (indicated by dashed lines and denoted by "7b" in FIG. 1) and returns it to the requesting node 2b.

Figure 2:
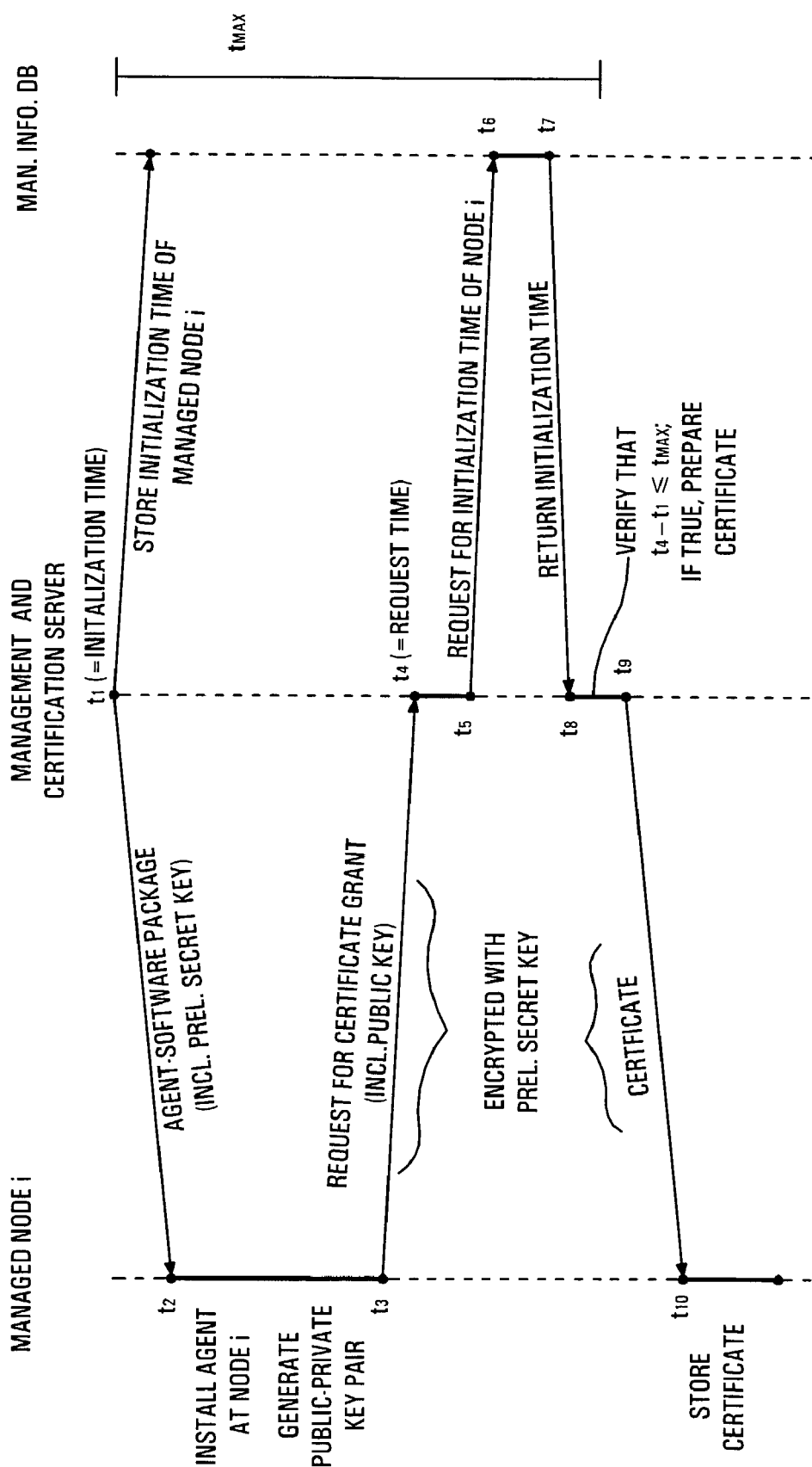
FIG. 2 is a timing diagram illustrating agent initialization and certificate grant.

FIG. 2 is a timing diagram illustrating the installation of an agent 4 (reference numerals refer to FIG. 1) and the grant of a public-key certificate 7 to the managed node 2 associated with the agent 4. FIG. 2 illustrates an embodiment in which the management server and the certification server run on the same machine. At time $t_1$, the combined management and certification server 8, 13 sends an agent-software package 17 to the agent 4 at a node 2 with node-ID i. The agent-software package 17 includes a preliminary secret key. At the same time, the combined management and certification server 8, 13 causes the initialization time (i.e. the time $t_1$) to be stored in the management information database 12 as an attribute of the managed node i. The agent-software package 17 is received at a time $t_2$ at the node i. In the time interval from $t_2$ to $t_3$, auto installation of the agent 4 at the node i is carried out. It includes the generation of a private key 5 and a public key 6 associated with the node i. Both keys 5, 6 are stored in the node i. The private key 5 is invisibly stored. The public key 6 may also be stored in the public-key and certificate directory 16. At the end of the auto-installation procedure at $t_3$, the agent automatically sends a request for the grant of a public-key certificate to the certification server 13. The request, which includes the node's public key 6, is encrypted with the preliminary secret key. At $t_4$, the certificate grant request is received at the combined management and certification server 8, 13. The time $t_4$ is the "request time". It is momentarily stored in the management and certification server 8, 13. At time $t_5$, the management and certification server 8, 13 requests the initialization time from the management information database 12, which receives this request at $t_6$ and returns the initialization time at $t_7$. It is received at time $t_8$. In the time interval from $t_8$ to $t_9$ the management and certification server 8, 13 verifies that the time interval between the request time and the initialization time is not larger than the maximum time interval 14. If the outcome of this verification step is positive, the management and certification server 8, 13 issues the requested public-key certificate 7 and forwards it to the requesting node i. The certificate 7 is encrypted with the preliminary secret key. The node i receives the certificate 7 at $t_{10}$ and stores it.

Figure 3:
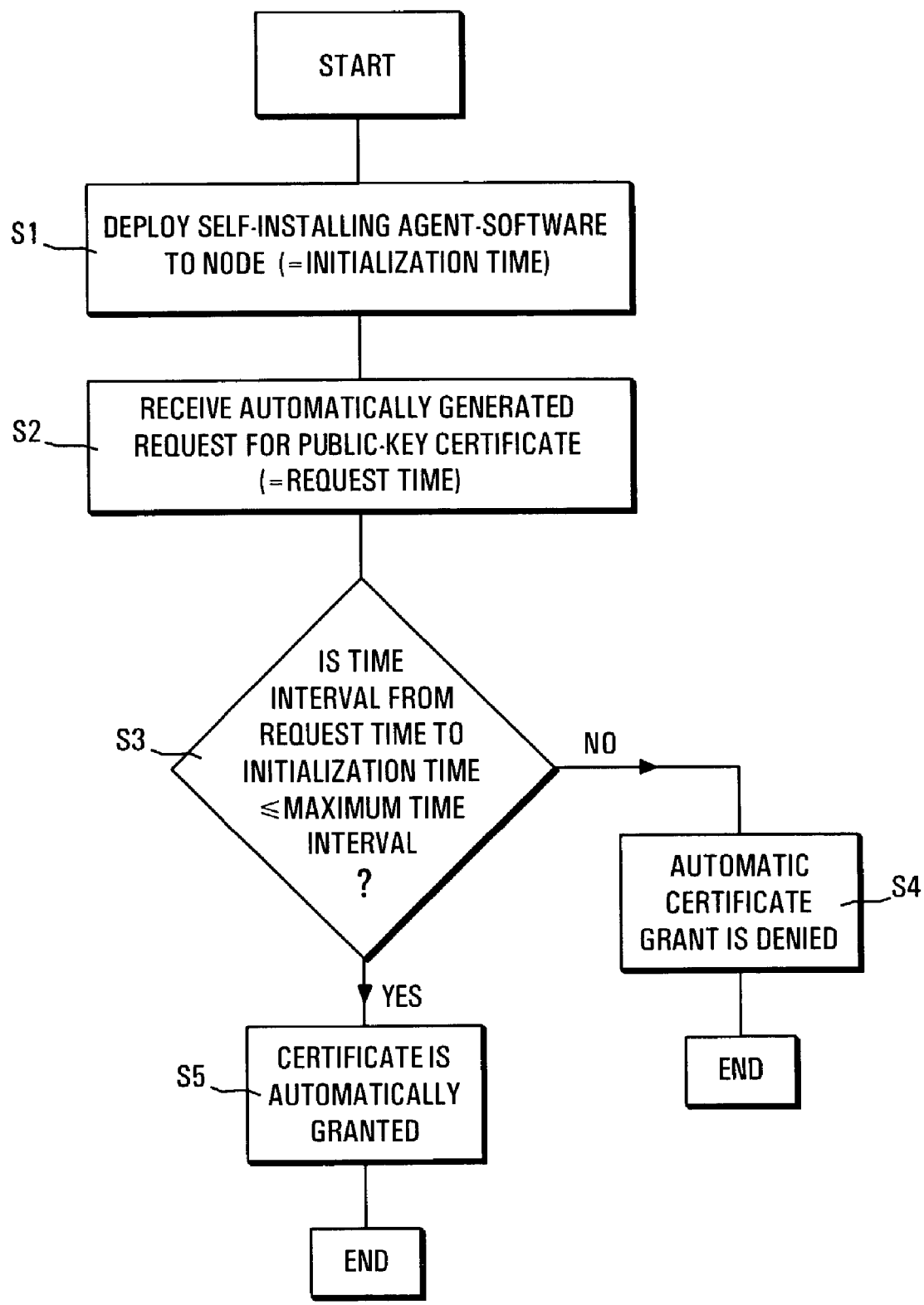
FIG. 3 is a flow diagram of the agent-initialization and certificate-grant process shown in FIG. 2.

FIG. 3 is a flow diagram of the agent-initialization and certificate-grant process carried out by the combined management and certification server, i.e., 8 and 13 combined of FIG. 2. In step S1, the self-installing agent software is deployed to a node at an "initialization time". As described in connection with FIG. 2, an agent is thereupon installed in the node; it automatically generates a request for a public-key certificate at the end of the installation procedure. In step S2, the management and certification server receives the automatically generated request for the certificate at a "request time". In step S3, the server ascertains whether the time interval from the request time to the initialization time is smaller than or equal to the maximum time interval. If the answer is negative, the requested automatic grant of a certificate is denied in step S4. If the answer is positive, the requested certificate is automatically granted and sent to the node in step S5.

Figure 4:
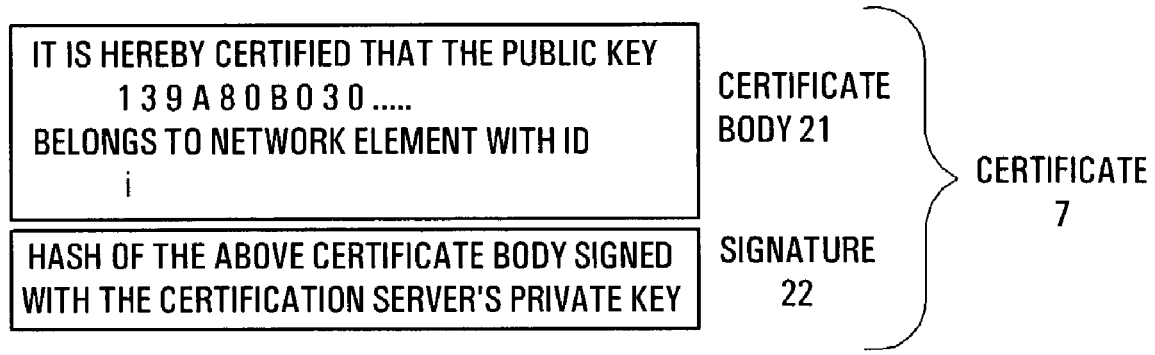
FIG. 4 is an exemplary simplified representation of a public-key certificate.

FIG. 4 is a simplified (human-readable) representation of a public-key certificate granted by the certification server to a managed node. Whereas normally a public-key certificate relates to a person or a company, the certificates of the embodiments bind the public key to a certain network element, characterized by the network element identifier. The network identifier is characteristic of the network element itself; it is independent of the network element's IP address or the like. The public key and the network element identifier form a first part of the certificate, called certificate body 21. The second part of the certificate is a signature 22. It is, for example, a hash of the certificate body 21 signed with the certification server's private key. Actually, the certificate used in the embodiments does not have the simplified human-readable form of FIG. 4, but is encoded in a machine-readable form, for example according to a standard for certificates called X.509 which is in widespread use on the Internet (see Tanenbaum, pp 767-768).

Figure 5:
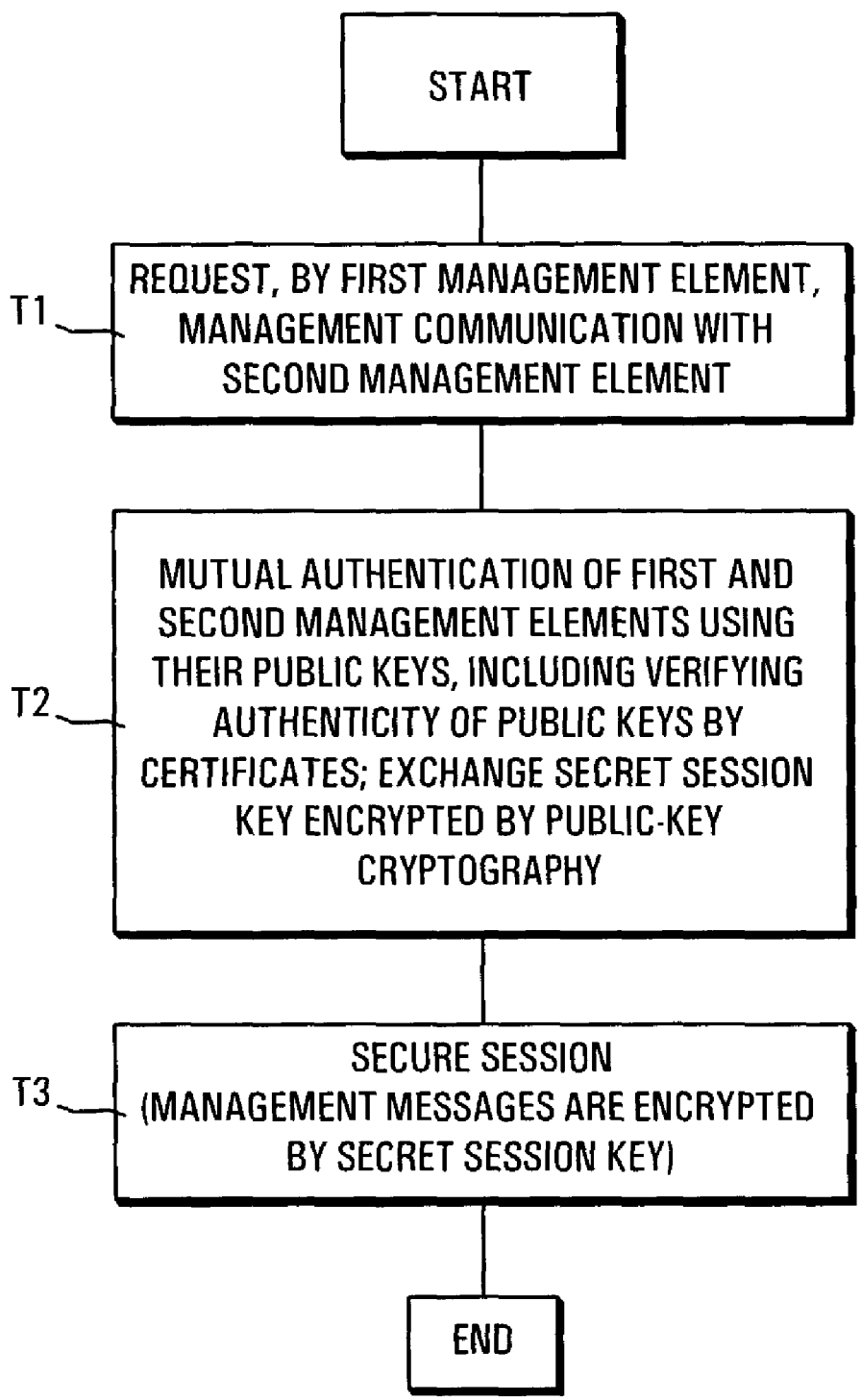
FIG. 5 is a flow diagram of authenticated management communication at the beginning of which a secure session is established.

FIG. 5 is a flow diagram of a management communication at the beginning of which a secure session is established. In step T1, a request for a management communication is sent from a first management element (e.g. a managed node) to a second management element (e.g. the management server or another managed node). In step T2, mutual authentication of the first and second management elements using their public keys is performed, for example according to the SSL subprotocol for establishing a secure connection. The mutual authentication includes verifying the authenticity of the public keys by the public-key certificates associated with them, as will be explained in more detail in connection with FIG. 7 below. During the authentication procedure, a secret session key is exchanged between the first and second management elements. It is encrypted with one of the management element's public keys and decrypted with the complementary private key. Accordingly, the secret key is only known to the first and second management elements. In step T3, a secure session is established. Management messages exchanged during the secure session are encrypted with the secret session key, for example according to the SSL subprotocol for data transmission using the secure connection.

Figure 6:
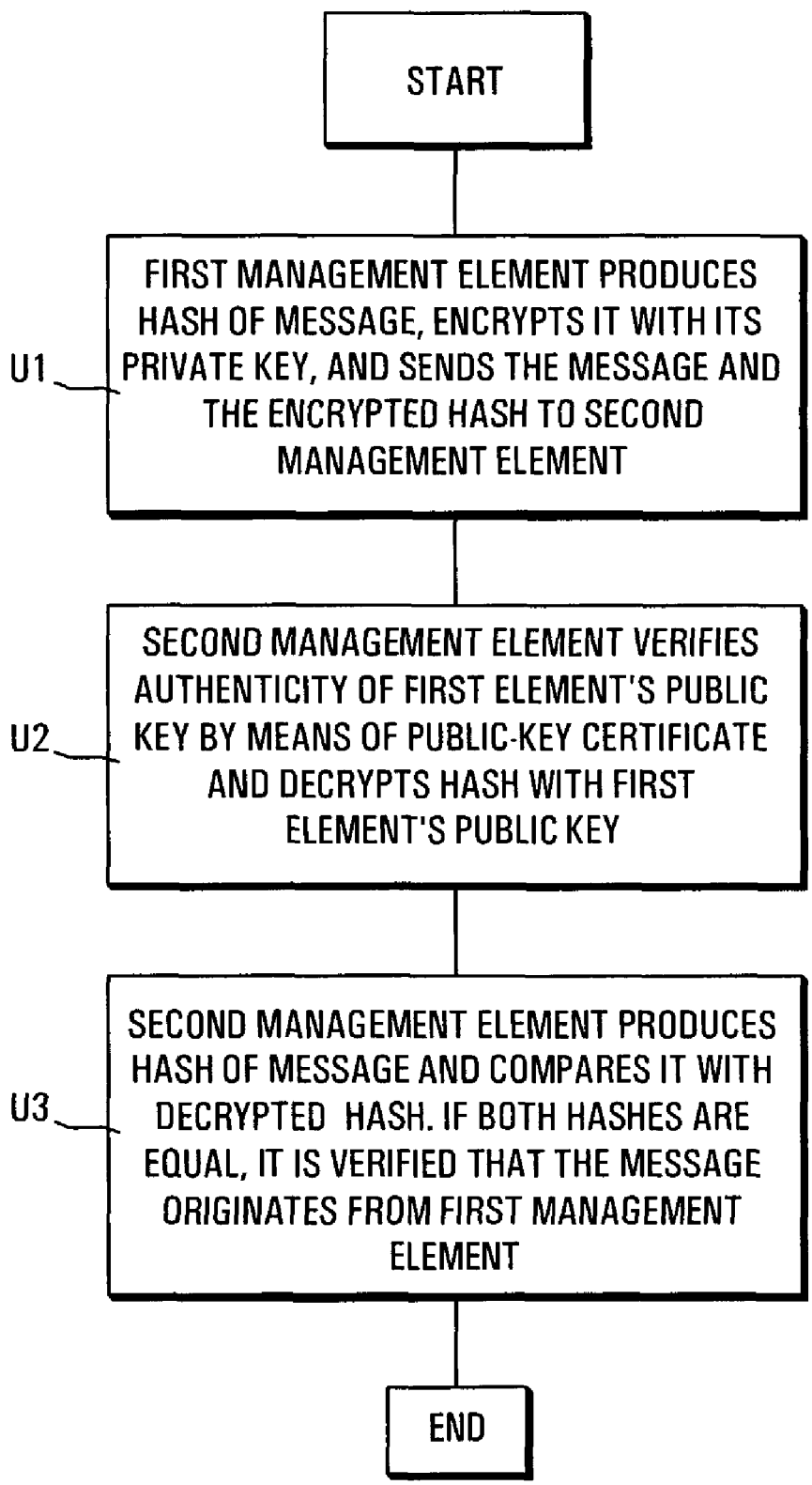
FIG. 6 is a flow diagram of another embodiment of authenticated management communication, using digital signatures.

FIG. 6 is a flow diagram of another embodiment of authenticated management communication, using digital signatures. In step U1, a first management element produces a hash of a management message, and encrypts it with its private key. The first management element sends the message together with the encrypted hash to the second management element. In step U2, the second management element verifies the authenticity of the first element's public key by means of the associated public-key certificate. If the authenticity of the public key is verified, it decrypts the hash with the first element's public key. In step U3, the second management element produces (another) hash of the message and compares it with the decrypted hash. If both hashes are equal, it is verified that the message originates from the first management element.

Figure 7:
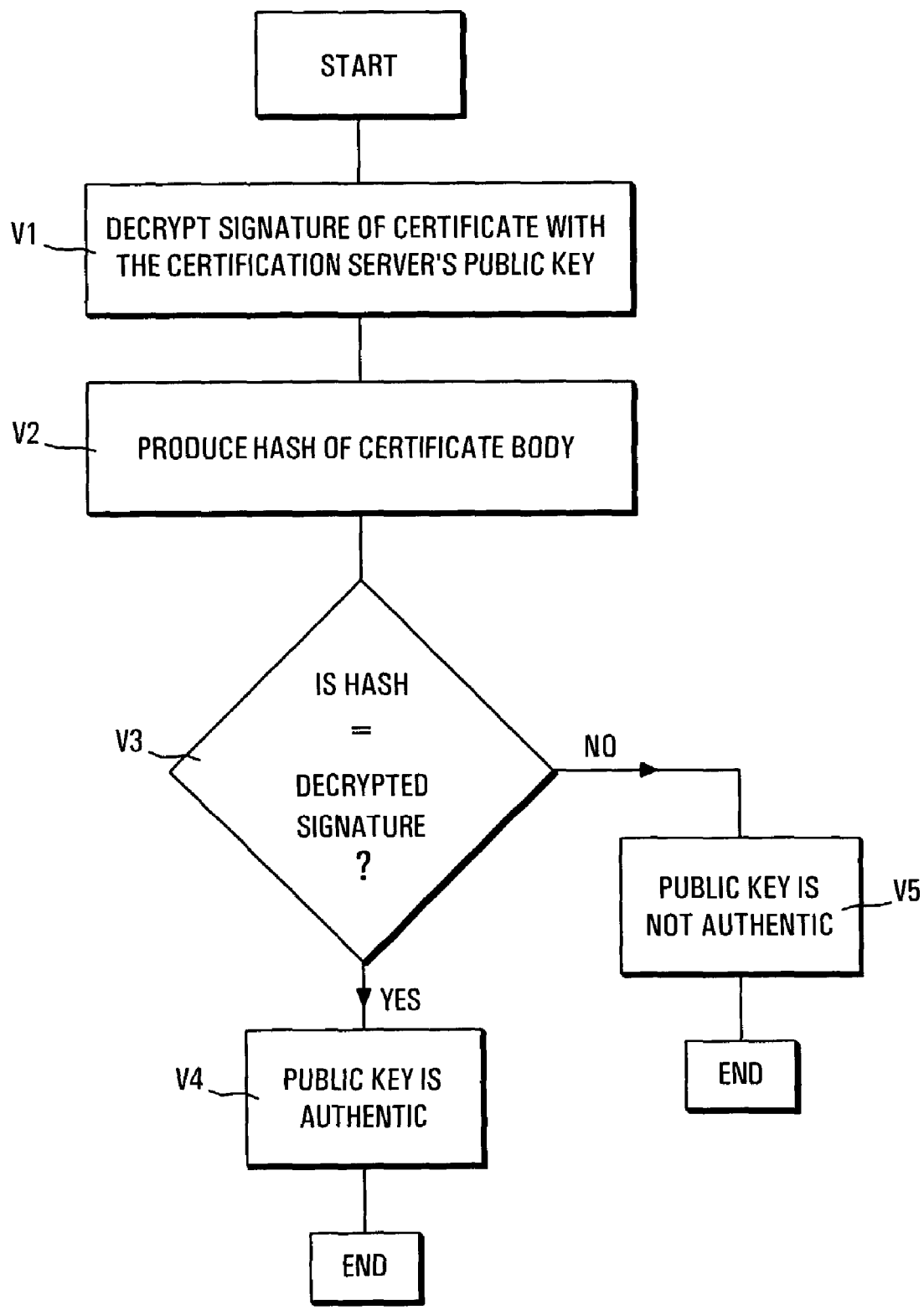
FIG. 7 is a flow diagram of a public-key verification procedure based on a public-key certificate.

FIG. 7 is a flow diagram of a public-key verification procedure based on the certificate associated with the public key, for example, the certificate 7 shown in FIG. 4. In step V1, the signature 22 (FIG. 4) of the certificate is decrypted with the certification server's public key. It is assumed that the certification server's public key is a "trust anchor" which need not be verified. For example, the certification server's public key may be unalterably stored in every management element. In step V2, a hash of the certificate body 21 (FIG. 4) of the certificate is produced. In step V3, it is ascertained whether this hash equals the decrypted signature. If the answer is positive, it has been verified that the public-key is authentic (step V4). However, if the answer is negative, the public key is not authentic (step V5).

Figure 8:
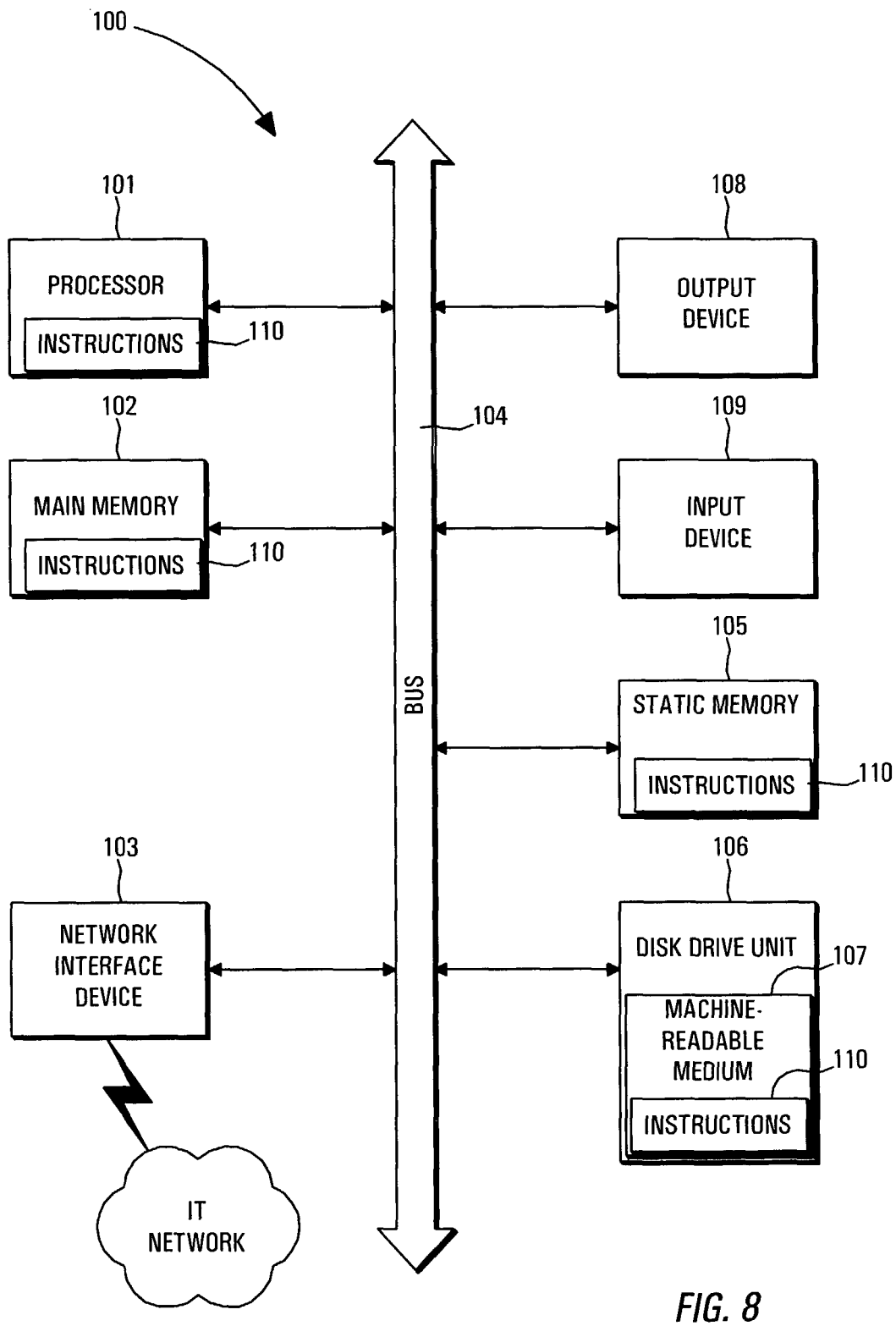
FIG. 8 is a diagrammatic representation of an exemplary computer system of the IT network within which a set of instructions, for causing the computer system to perform any of the methodologies discussed herein, may be executed.

FIG. 8 is a diagrammatic representation of an exemplary computer system 100 of the IT network within which a set of instructions, for causing the computer system to perform any of the methodologies discussed herein, may be executed. The computer system 100 may, for example, be one of the managed nodes 2, the management server 8 or the certification server 13 of FIG. 1. It includes a processor 101, a memory, for example a main memory 102, and a network interface device 103 by which it is coupled to the IT network. The components of the computer system 100 communicate with each other via a bus 104. There may be further optional storage components, such as a static memory 105 and a disk-write unit 106 with a machine-readable medium 107. Optionally, the computer system 100 may also include an output device 108, such as a video display, and an input device 109, such as an alpha-numeric keyboard and/or a cursor-control device.

A set of instructions (i.e. software) 110 embodying any one, or all, of the methodologies described above resides completely, or at least partially, within the processor 101 and/or the main memory 102. The software 110 is also shown to be stored, completely, or at least partially, in the static memory 105 and on the machine-readable medium 107. It may further be transmitted or received via the network interface device 103 over the IT network. The software 110 may be distributed over several processors or computers, for example over managed nodes, the management server and the certification server.

Thus, a general purpose of the disclosed embodiments is to provide improved methods and products which enable the amount of necessary human interaction in network management to be reduced, without creating an unacceptable security gap.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodi-

What is claimed is:

1. A method of selectively granting a public-key certificate to a managed node in an IT network having certification capability, the managed node having an initialization time associated with the installation time of a software agent in the managed node, the method comprising:
   detecting, by a computer system, the initialization time;
   after the initialization time, receiving, by the computer system, a request to grant the certificate from the managed node;
   detecting, by the computer system, the time of the request by the managed node;
   responding, by the computer system, to the detected times by ascertaining whether an initialization-to request time interval between the detected initialization time and the detected request time is within a maximum time interval for automatic certificate grant;
   automatically granting, by the computer system, the requested certificate to the requesting managed node only if the ascertained initialization-to-request time interval is within the maximum time interval, and if the ascertained initialization-to-request time interval is outside the maximum time interval, preventing the automatic granting of the requested certificate to the requesting managed node.

2. The method of claim 1, wherein the maximum time interval for automatic certificate grant is set by an administrator or operator of the IT network.

3. The method of claim 1, wherein the initialization time is the time a management agent is sent to the managed node, the management agent, during its installation at the managed node, installing public and private keys in the managed node.

4. The method of claim 1, wherein the initialization time is the time when a management server or a combined management and certification server initiates the installation of the management agent at the managed node.

5. The method of claim 1, further including storing the initialization time as a property of the managed node.

6. The method of claim 5, wherein the ascertaining step includes using the stored initialization time to determine the initialization-to-request time interval.

7. The method of claim 1, wherein the detected request time is the time of receipt, by a management server or a combined management and certification server, of the managed node's request to grant a certificate.

8. The method of claim 1, further including authenticating the managed node after the certificate has been granted to the managed node, the managed node being authenticated in management communications with a management server or combined management and certification server using the managed node's public key and public-key certificate and a private key of the managed node associated with its public key.

9. The method of claim 8, further including authenticating the management server or the combined server or the other managed node by using a public key of the management server or the combined server or the other managed node.

10. The method of claim 1 further including the following steps after the initialization time and before the managed node transmits the request:
    loading, at the managed node, an agent including the capability of generating public and private keys at the managed node; then causing the agent to generate the public and private keys at the managed node; then transmitting the request for the certificate from the managed node.

11. The method of claim 1, wherein the initialization time is any of the following: actual installation time of the software agent on the managed node; the time when a management node deploys the software agent to the managed node; the time when a management node sends a request to the managed node to start installation of the software agent; the time the managed node sends a confirmation indicating it has started installation of the software agent; the time the managed node sends a confirmation indicating it has completed installation of the software agent; the time a management node receives a confirmation of the managed node sending a confirmation indicating the managed node has started installation of the software agent; the time a management node receives a confirmation of the managed node sending a confirmation indicating the managed node has completed installation of the software agent.

12. A process of setting-up a management agent in a node of an IT network in which managed nodes are authenticated in management communications, the IT network having a certification capability, the authentication being based on public-key cryptography, comprising:
    starting, by a computer system, the process;
    at the start of the process installing, by the computer system, the agent at the node;
    requesting, by the agent, the server to grant a public-key certificate, at a request time;
    determining, by the processor, (a) the start time of the process, (b) the request time by the agent, (c) the time interval between the determined start and request times, and automatically granting the requested certificate only in response to the determined time interval between the determined start time of the process and the determined request time is within a maximum time interval for automatic certificate grant; or in the alternative, preventing the automatic granting of the requested certificate to the requesting managed node, in response to the determined time interval between the determined start time and the determined request time being outside the maximum time interval for automatic certificate grant.

13. The process of claim 12, wherein the maximum time interval for automatic certificate grant is set by an administrator or operator of the IT network.

14. The process of claim 12, wherein the start time is the time of installation of the management agent at the managed node.

15. The process of claim 12, wherein the time when a management server initiates the installation of the management agent at the managed node is the start time.

16. The process of claim 12, further including storing the start time as a property of the managed node.

17. The process of claim 16, further including using the stored start time to determine whether the time interval between the start time and the request time is within the maximum time interval for automatic certificate grant.

18. The process of claim 12, wherein the request time is the time of receipt of the managed node's request to grant a certificate at the certification server.

19. The method of claim 12, further including, after the certificate has been granted to the managed node, authenticating the managed node in management communications with a management server or combined management and certification server by using the managed node's public key and public-key certificate and a private key of the managed node associated with its public key.

20. The method of claim 12, further including authenticating the management server or the other managed node by using a public key of the management server or combined management and certification server.

21. The process of claim 12 further comprising a certification server or combined management and certification server.

22. The process of claim 21 further including performing the following steps after the start of the process and before the managed node transmits the request: loading, at the managed node, an agent including the capability of generating public and private keys at the managed node; then causing the agent to generate the public and private keys at the managed node; then transmitting the request for the certificate from the managed node to the certification server.

23. A certification server or combined management and certification server arranged to:
    determine (a) an initialization time associated with the installation of a software agent at a managed node and (b) a request time by a managed node in an IT network for a public-key certificate, and
    ascertain whether the time interval between the determined initialization time and the determined request time is within a maximum time interval for automatic certificate grant; and
    automatically granting the requested certificate to the managed node only if the ascertained time interval is within the maximum time interval and preventing automatic granting of the requested certificate to the managed node if the ascertained time interval exceeds the maximum time interval.

24. The server of claim 23, wherein the initialization time is any of the following: actual installation time of the software agent in the managed node; the time when the server deploys the software agent to the managed node; the time when the server sends a request to the managed node to start installation of the software agent; the time when the managed node sends to the server a confirmation indicating the managed node has started installation of the software agent; the time the managed node sends to the server a confirmation indicating the managed node has completed installation of the software agent; the time the server receives a confirmation of the managed node sending a confirmation indicating the managed node has started installation of the software agent; the time the server receives a confirmation of the managed node sending a confirmation indicating the managed node has completed installation of the software agent.

25. A managed IT network comprising:
    a management server, a certification server and a node, or a combined management/certification server and a node,
    wherein the management server or the management/certification server is arranged to initiate installation of a management agent at the node at an initialization time;
    wherein the agent is arranged to request the certification server or the management/certification server to grant a public-key certificate, at a request time; and
    wherein the certification server or the combined management/certification server is arranged to (a) determine the initialization time and the request time; (b) automatically grant the requested certificate to the managed node only if the time interval between the determined initialization time and the determined request time is within a maximum time interval for automatic certificate grant; and (c) prevent automatic granting of the requested certificate to the managed node if the time interval between the determined initialization time and determined request time exceeds the maximum time interval.

26. The network of claim 25 wherein the agent is arranged to generate public and private keys at the node after the initialization time and prior to the agent requesting the public key certificate.

27. A managed IT network comprising at least first and second management systems, wherein a private-public key pair is assigned to at least the first management system and the second system has certification capabilities, wherein the IT network is arranged, by a processor, to authenticate, in management communications between the first and second management facilities, at least the first management system by using the private-public key pair of the first management system;
    wherein the second system is arranged, by a processor, to
    (a) detect initialization time associated with installation of a software agent at the first management element and a certificate request time by the first management element, (b) verify the authenticity of the first management element's public key by automatically granting a public-key certificate to the first management element only in response to a time interval between the detected times being within a maximum time interval for automatic certificate grant, and (c) prevent automatic issuing a public-key certificate to the first management element in response to a time interval between the detected times exceeding the maximum time interval for certificate grant.

28. The network of claim 27 wherein the first managed element is arranged to perform the following steps after the initialization time and prior to a request being made to verify the authenticity of the first management elements public key by a public key certificate loading an agent including the capability of generating public and private keys at the managed node; then causing the agent to generate the public and private keys at the managed node; then transmitting the request for the certificate from the first management element.

29. The network of claim 27, wherein the initialization time is any of the following: actual installation time of the software agent in the first management element; the time when the second system deploys the software agent to the first management element; the time when the second facility sends a request to the first management element to start installation of the software agent; the time the first management element sends, to the second system, a confirmation indicating the first element has started installation of the software agent; the time the first management element sends a confirmation to the second system indicating the first element has completed installation of the software agent; the time the second system receives a confirmation of the first management element sending a confirmation indicating the first management element has started installation of the software agent; the time the second system receives a confirmation of the first management element sending a confirmation to the second facility indicating the second system has completed installation of the software agent.

30. A storage drive unit including program code for carrying out a method, when executed on a computer system, of granting a public key certificate to a managed node in an IT network, the managed node having an initialization time associated with the installation time of a software agent in the managed node, the program code being arranged to cause a certification server or a combined management and certification server of the computer system to:
    receive, after the initialization time, a request to grant a certificate from the managed node;
    detect the initialization time;
    detect the time of the request;

ascertain whether the time interval between the detected initialization time and the detected request time is within a maximum time interval for automatic certificate grant;
automatically grant the requested certificate to the requesting managed node only if the ascertained initialization-to-request time interval is within the maximum time interval, and prevent the automatic granting of the requested certificate to the requesting managed node if the ascertained initialization-to-request time interval exceeds the maximum time interval.

31. The computer program product of claim 30 wherein the computer program product is arranged to cause the computer system to perform the following steps after the initialization time and before the managed node transmits the request:
loading, at the managed node, an agent including the capability of generating public and private keys at the managed node; then causing the agent to generate the public and private keys at the managed node; then transmitting the request for the certificate from the managed node to the server.

32. The product of claim 30 wherein the initialization time is any of the following: actual installation time of the software agent in the managed node; the time when the server deploys the software agent to the managed node; the time when the server sends a request to the managed node to start installation of the software agent; the time the managed node sends, to the second system a confirmation indicating the management node has started installation of the software agent; the time the managed node sends to the second system a confirmation indicating the management node has completed installation of the software agent; the time the second system receives a confirmation of the managed node sending a confirmation to the second system indicating the managed node has started installation of the software agent; the time a management node receives a confirmation of the managed node sending a confirmation indicating the managed node has completed installation of the software agent.

33. A storage drive unit including program code for carrying out a process, when executed in a managed IT network in which managed nodes are authenticated in management communications, the authentication being based on public-key cryptography, of setting-up a management agent in a node, the program code being arranged to cause the network to perform the following steps after the process has been started:
the agent to be installed at the node at the start of the process;
the agent to request a certification server or a combined management and certificate server to grant a public-key certificate, at a request time;
the server to (a) detect the start time of the process, (b) detect the request time, (c) automatically grant the requested certificate only if the time interval between the detected start of the process and the detected request time is within a maximum time interval for automatic certificate grant, and (d) to prevent the automatic granting of the requested certificate if the time interval between the detected start of the process and the detected request time is outside the maximum time interval for certificate grant.

34. The computer program product of claim 33 wherein the computer program product is arranged to cause the network to perform the following steps after the start of the process and before the managed node transmits the request:
loading, at the managed node, an agent including the capability of generating public and private keys at the managed node; then causing the agent to generate the public and private keys at the managed node; then transmitting the request for the certificate from the managed node to the server.

* * * * *